United States Patent
Almalki (10) Patent No.: US 9,914,436 B2
(45) Date of Patent: Mar. 13, 2018

(54) AUTOMATED VEHICLE SNOW AND ICE REMOVAL

(71) Applicant: Bader Abdullah Almalki, Cedar Falls, IA (US)

(72) Inventor: Bader Abdullah Almalki, Cedar Falls, IA (US)

( * ) Notice: Subject to any disclaimer, the term of this patent is extended or adjusted under 35 U.S.C. 154(b) by 321 days.

(21) Appl. No.: 14/724,519

(22) Filed: May 28, 2015

(65) Prior Publication Data

US 2016/0347288 A1    Dec. 1, 2016

(51) Int. Cl.
*B60S 1/48* (2006.01)
*B60S 1/52* (2006.01)

(52) U.S. Cl.
CPC .......... *B60S 1/485* (2013.01); *B60S 1/488* (2013.01); *B60S 1/522* (2013.01)

(58) Field of Classification Search
None
See application file for complete search history.

(56) References Cited

U.S. PATENT DOCUMENTS 8,302,241 B2 * 11/2012 Reed ................. B60S 3/042
  15/53.2
9,376,092 B2 * 6/2016 Essenburg ........... B60S 3/044

FOREIGN PATENT DOCUMENTS

EP    1 857 338 B1    1/2011
JP    2011-247585 A    12/2011

* cited by examiner

*Primary Examiner* — Michael E Barr
*Assistant Examiner* — Rita P Adhlakha
(74) *Attorney, Agent, or Firm* — Oblon, McClelland, Maier & Neustadt, L.L.P.

(57) ABSTRACT

A system for clearing snow and ice from a vehicle surface having a robotic arm, a brush, a control system, wireless communication circuitry, and an electrical power source where the brush is mounted on the robotic arm, and the robotic arm is mounted on a vehicle and articulates about multiple axes and moves the brush over the vehicle surface, and the motor spins the brush, the movements based on a coordinate data set transmitted to the control system for operation on a specific vehicle type, make and model.

17 Claims, 14 Drawing Sheets

AUTOMATED VEHICLE SNOW AND ICE REMOVAL

GRANT OF NON-EXCLUSIVE RIGHT

This application was prepared with financial support from the Saudi Arabian Cultural Mission, and in consideration therefore the present inventor(s) has granted The Kingdom of Saudi Arabia a non-exclusive right to practice the present invention.

BACKGROUND

Field of the Disclosure

The present disclosure is directed toward a system and method for the removal of snow and ice from exterior vehicle surfaces.

Description of the Related Art

Vehicles operating in cold climates are generally required to maintain visibility and to have at least a portion of their surfaces clear of snow and ice accumulation for safety and operational purposes.

These requirements are often mandated by law, in the same way that the use of windshield wipers is required to maintain visibility for drivers on wet roads or in the rain. For example, U.S. Federal Motor Vehicle Safety Standards (FMVSS) dictate that on-highway vehicles must be equipped with windshield defrosters as well as a minimum rate at which a defroster must melt a layer of ice of given thickness.

Further, other regulations mandate visibility and lighting requirements. There are also regulations to prevent loose objects from falling off of vehicles in operation, such as those found in U.S. Federal Motor Carrier Safety Regulations (FMCSR) 393.100 which prescribes requirements for the securement of cargo on heavy trucks.

Aside from impaired outward visibility for drivers, snow and ice at risk of falling from a moving vehicle also presents a hazard to pedestrians and other drivers, and continues to be an ongoing concern. When inclement weather occurs, some drivers are not prepared to properly clear their vehicles of accumulated snow and ice, and drive on public roads without adequate visibility and/or with accumulated precipitation on their vehicles, such as large sheets of ice, which can dislodge at speed. These drivers and their vehicles pose a risk to public safety and are more apt to cause property damage.

SUMMARY

The present disclosure is directed toward an automated system and method for the removal of snow and ice from horizontal, vertical, and compound surfaces, for a variety of vehicle types to provide necessary outward visibility and to reduce the risk of accidents and property damage.

The foregoing general description of the illustrative implementations and the following detailed description thereof are merely exemplary aspects of the teachings of this disclosure, and are not restrictive.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein.

DETAILED DESCRIPTION OF THE EMBODIMENTS

Figure 1:
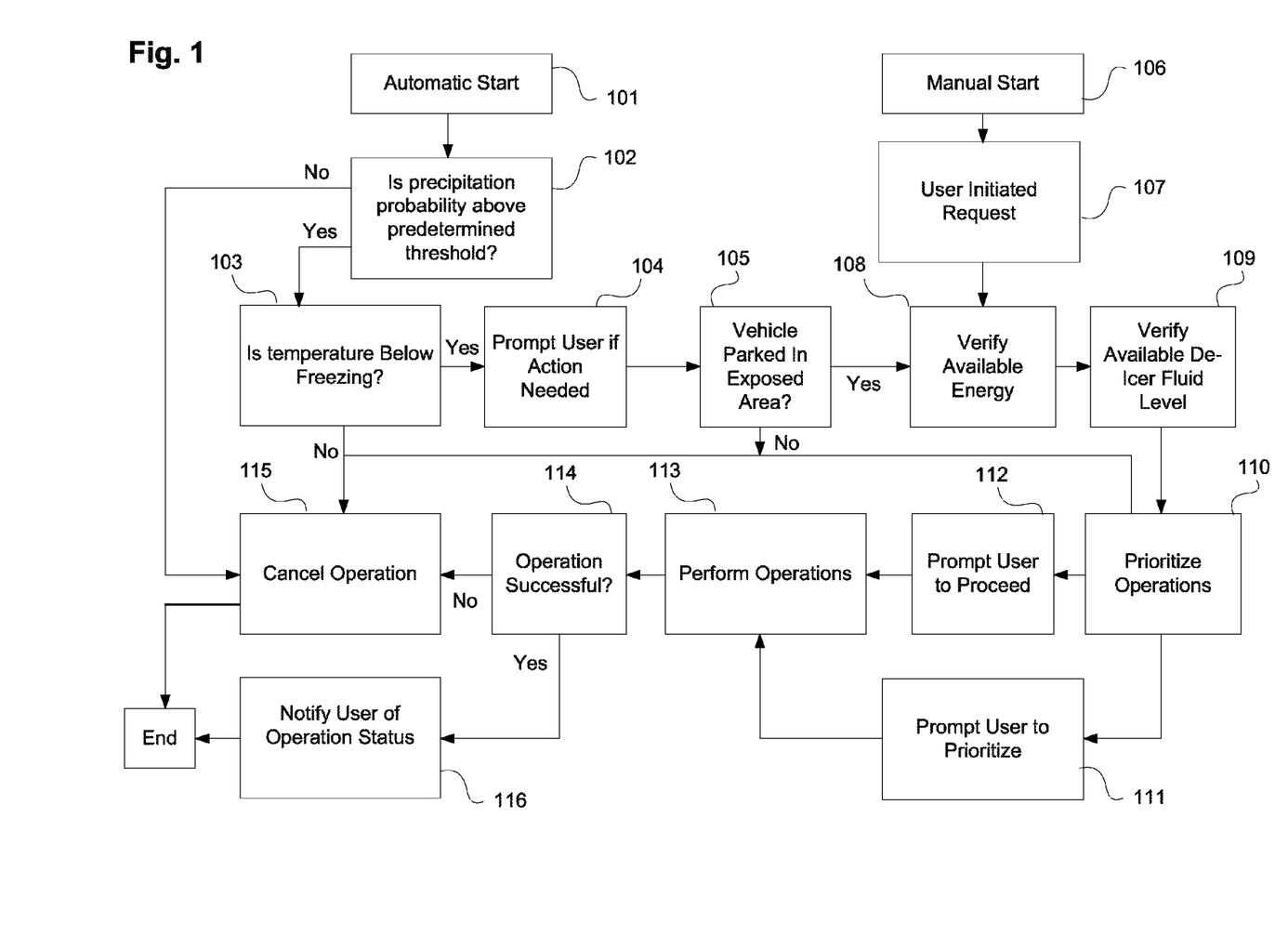
FIG. 1 is a diagram of an embodiment of an automated process of clearing snow and ice from a vehicle.

FIG. 1 is a diagram of an embodiment of an automated process of clearing snow and ice from a vehicle and performed by the control module 6 of a vehicle snow removal apparatus 1 to initiate a vehicle deicing and snow clearing operation.

Step 101 is for an automatic start condition based on predetermined criteria, for example weather forecasts or temperature readings.

At Step 102 the control module 6 determines if the likelihood of precipitation is above a predetermined probability for a predetermined future time window by communicating with external sources, for example wirelessly using wireless circuitry 14, and receiving weather forecasts based on, for example, the probability of precipitation, accumulation and ambient temperatures of the GPS location of the vehicle snow removal apparatus 1. If criteria for inclement weather are met the control module 6 proceeds to Step 103. If not the control module 6 proceeds to Step 115.

At Step 103 the control module 6 analyzes the temperature detected by a temperature sensor 12. If the temperature reading is below freezing the control module 6 proceeds to Step 104. If the temperature reading is not below freezing the control module 6 proceeds to Step 115.

At Step 104 the control module 6 prompts the user to determine if the vehicle will be needed during the upcoming time window, and if pre-treatment of the vehicle 98 surface is desired.

At Step 105 the control module 6 prompts the user to confirm if the vehicle is parked outside in an area exposed to the weather. If so the control module 6 proceeds to Step 108. If not the control module 6 proceeds to Step 115.

Step 106, unlike Step 101, is the beginning of a user initiated manual start process for the operation of the vehicle snow removal apparatus 1.

At Step 107 the control module 6 receives the user's request for the vehicle snow removal apparatus 1 to begin operating.

At Step 108 the control module 6 checks the energy available in a battery 2 or other energy source.

At Step 109 the control module 6 calculates total available deicing fluid level based on the amount of fluid dispensed during previous uses, as measured by the flow meter 8, since the installation of each reservoir 50.

At Step 110 the control module 6 prioritizes the order of operations of the apparatus. A detailed description of Step 110 is provided in FIG. 2. If there are sufficient resources for completion of all the tasks then the control module 6 proceeds to Step 112. If there are not sufficient resources for completion of all the tasks then the control module 6 proceeds to Step 111.

At Step 111 the control module 6 prompts the user to prioritize and select the tasks to be performed by the vehicle snow removal apparatus 1 for which there is sufficient energy and deicing fluid. The tasks are prioritized by default by the control module 6 with the user provided the choice to either approve, reprioritize the order of selected tasks, or cancel the operation.

At Step 112 the control module 6 estimates there are adequate resources to complete all of the selected tasks, and the user is prompted to proceed or cancel the operation.

Figure 12:
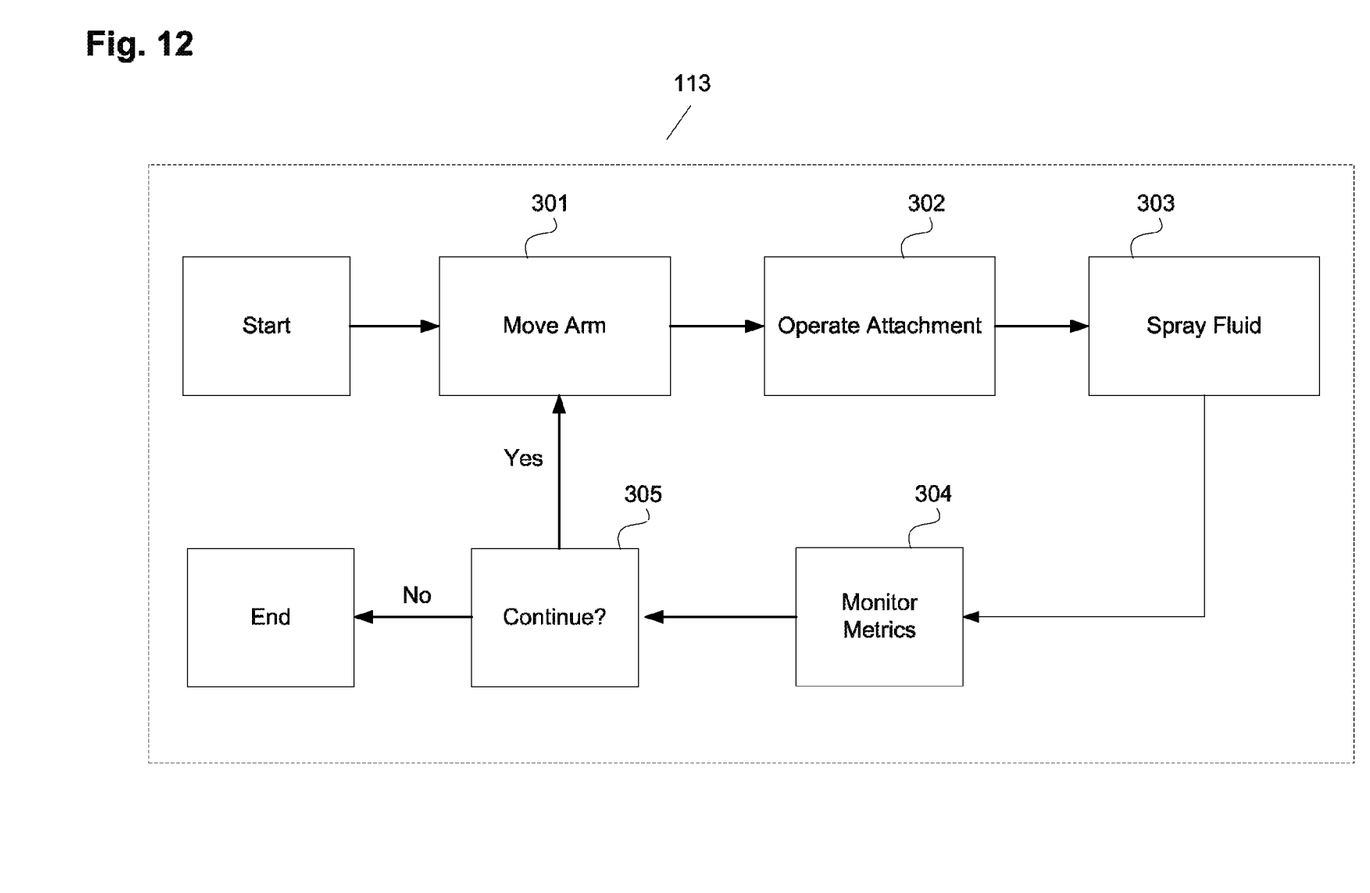
FIG. 12 is a detailed diagram of an embodiment of a process of removing snow and ice from a vehicle surface.

A detailed description of Step 113 is provided in FIG. 12.

Step 114 the control module 6 determines if all the scheduled tasks were completed. If so then the control module 6 proceeds to Step 116. If not then the control module 6 proceeds to Step 115.

At Step 115 the control module 6 determines if the operation was canceled or unsuccessful, and the user is provided with confirmation or informed of the technical issue resulting in the automatic cancellation of the operation.

At Step 116 the user is notified of successful completion of the operation.

Figure 2:
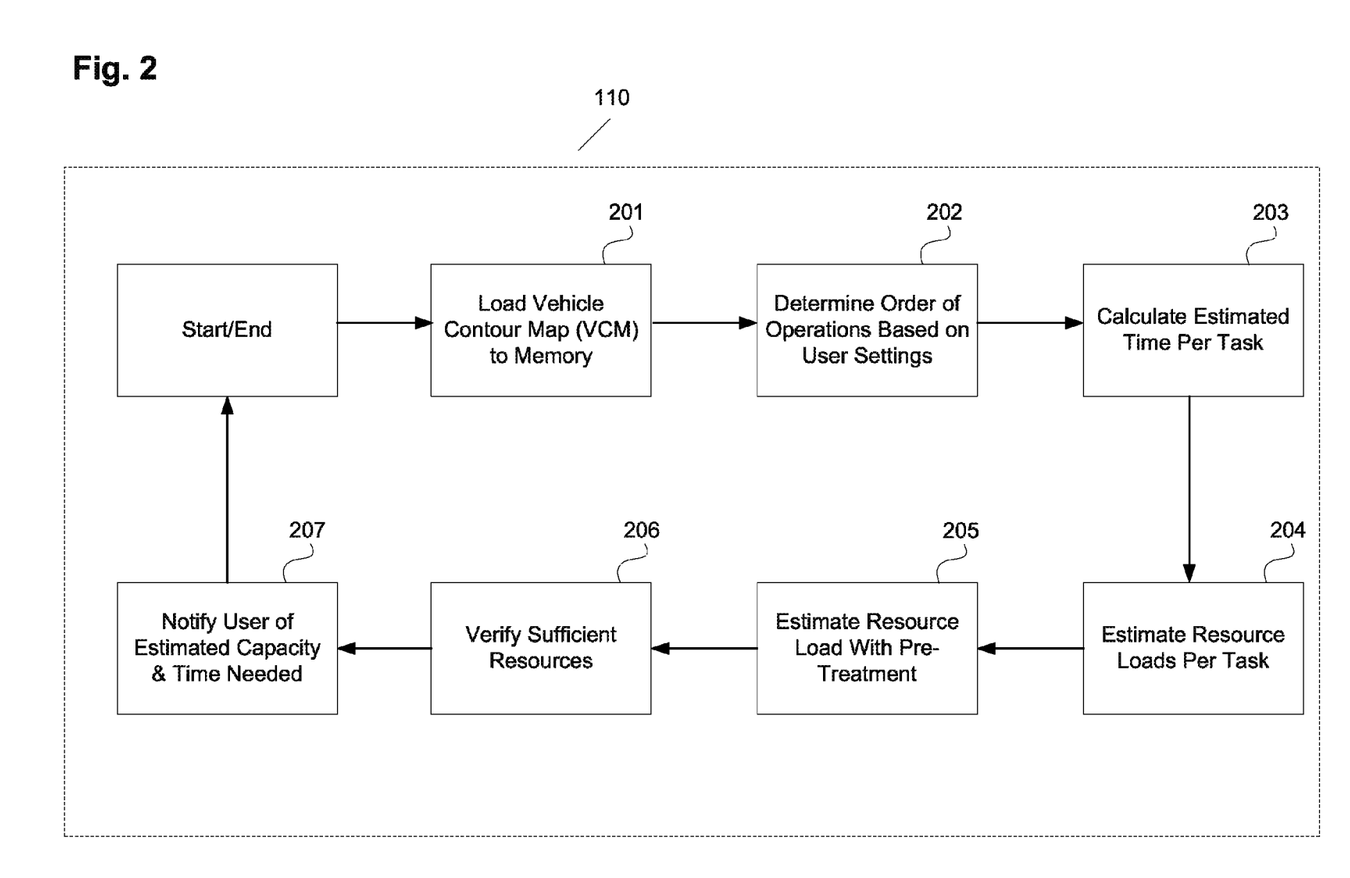
FIG. 2 is a detailed diagram of an embodiment of a process of prioritizing operations of a snow and ice removal apparatus.

FIG. 2 is a detailed diagram of an embodiment of a process, shown at Step 110 (FIG. 1), performed by the control module 6 to prioritize operations.

At Step 201 the control module 6 loads a Vehicle Contour Map (VCM) to memory 7. The VCM is a data set of coordinates specific to the type of vehicle 98 model the vehicle snow removal apparatus 1 is connected to, telling the vehicle snow removal apparatus 1 areas of the surface to move over or avoid. The VCM is obtained in a number of ways, for example pre-installed in the control module 6, downloaded from a database via the wireless circuitry 14, or created by the control module 6 based on an initiation procedure upon installation of the vehicle snow removal apparatus 1 on a vehicle. The control module 6 can verify the accuracy of a downloaded or preloaded VCM by comparing it to coordinate data obtained through at least one torque sensor 4 or at least one torque sensor 5 as part of the initiation procedure. The VCM can be revised or edited by user input to account for particular areas of the vehicle 98 to accommodate inaccuracies or vehicle customization.

The position of the brush 56 and the vehicle snow removal apparatus 1 relative to the vehicle are determined by the control module 6. The control module 6 identifies the location of the vehicle snow removal apparatus 1 by making contact between the brush 56 and the vehicle at a number of points on the vehicle and comparing those coordinates to the data of the VCM.

The VCM represents the vehicle surface as a number of zones or areas, each with coordinate data specific to that zone, for example the windshield, the passenger side glass, the driver side glass, the rear window, the door handles and locks area. Thus the control module 6 determines and prioritizes the number of tasks needed to perform the deicing and snow removal process for the entire vehicle 98 surface.

At Step 202 the control module 6 loads default user settings from the memory 7 and determines the order of operations based on those user settings.

At Step 203 the control module 6 calculates the estimated time to perform each task based on the rotational speed of the brush 56 and an assumed snow or ice area coverage and density on each vehicle surface zone, how fast the vehicle snow removal apparatus 1 moves, and how much deicing fluid spray is needed for the spray interval for a given zone.

At Step 204 the control module 6 estimates resource loads to complete each task based on the information obtained in Steps 102, 108, 109 (FIG. 1), and operations identified in Step 202.

At Step 205 the control module 6 estimates the potential time energy and fluid savings if pre-treatment of the vehicle 98 surface, based on forecasted temperature and precipitation between the present time and when the vehicle 98 is needed, is completed. Estimated time, energy, and fluid needed is based on predetermined data for example historical database of the actual vehicle 98 and aggregate historical data or real time data from a plurality of vehicles, or the same vehicle model, located within a specific distance of said vehicle, using a vehicle snow removal apparatus 1 and communicating that to said vehicle snow removal apparatus 1, whether directly or through another data source.

At Step 206 the control module 6 determines if sufficient energy and deicing fluid resources are available to complete the tasks for the given VCM. If the operation of the vehicle snow removal apparatus 1 was initiated by Step 106 (FIG. 1) the control module 6 compares the resource load from Step 204 with the available resources from Step 108 and Step 109.

At Step 207 the control module 6 notifies the user of estimated resource capacity and time needed. Resources include energy and deicing fluid. Upon completion of this operation, described by FIG. 2 the control module 6 proceeds to either Step 111 or Step 112 (FIG. 1), depending on the outcome of Step 206.

If the operation of the vehicle snow removal apparatus 1 is initiated by Step 101 (FIG. 1) then the control module 6 compares the result of the calculation in Step 205 with the revised estimated resource load of Step 204 to determine if there is a resource savings for pre-treatment of the vehicle 98 surface and the quantity of savings.

At Step 207 the control module 6 notifies the user of the estimated capacity available and the time needed to complete the selected tasks of the operation.

Figure 3A:
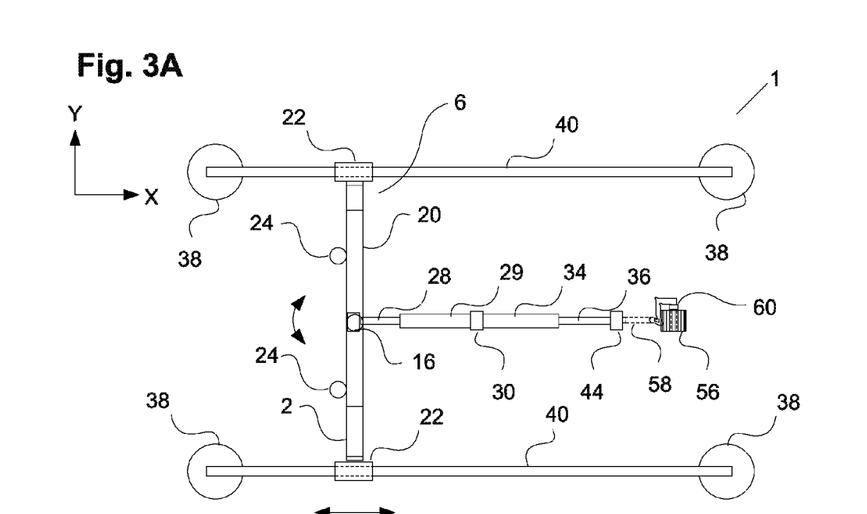
FIGS. 3A, 3B, and 3C are plan, side, and front views, respectively, of an embodiment of a vehicle snow and ice removal apparatus.
Figure 3B:
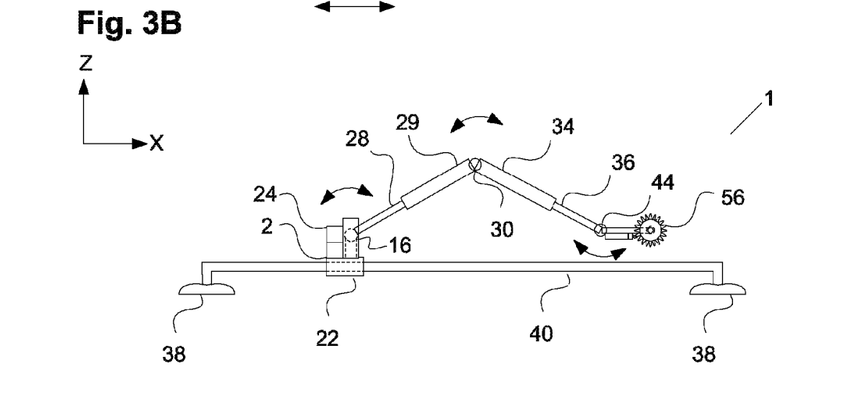
Figure 3C:
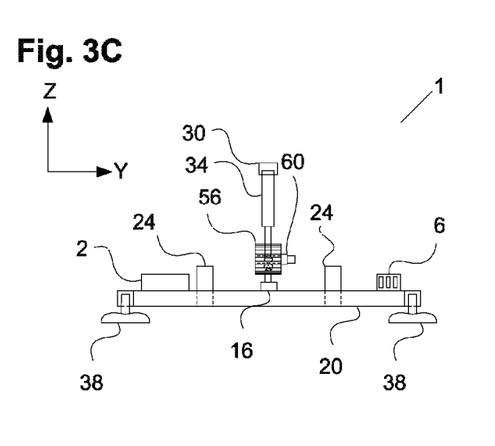

FIGS. 3A, 3B, and 3C are plan, side, and front views, respectively, of an embodiment of a vehicle snow removal apparatus 1 having linear motors 22 and track mounts 40. Each track mount 40 is attached to a mounting 38 at each end. The linear motor 22 slides along the length of the track mount 40, described as the X-axis.

In this embodiment the track mount 40 serves as the primary, akin to the stator of a rotating electric motor, while the linear motor 22 serves as the secondary, akin to the rotor of a rotating electric motor, the combination operating as a linear motor.

Each linear motor 22 is connected to the opposite linear motor 22 by a crosstrack 20, the crosstrack 20 having a control module 6, a base joint assembly 16, a battery 2, and at least two reservoir mounts 24. The base joint assembly 16 is connected to an upper arm B 28, an upper arm A 29, an elbow joint 30, a forearm A 34, a forearm B 36, a wrist joint assembly 44, a brush mount 58, a brush motor 60, and a brush 56. The base joint assembly 16 rotates about the Y and Z axes. The elbow joint 30 rotates about the Y axis. The wrist joint assembly 44 rotates about the X and Y axes in this diagram. The brush 56, the brush mount 58, and the brush motor 60 pivot about the wrist joint assembly 44. The forearm A 34 and the forearm B 36 form the forearm assembly 32, which telescopes and pivots about the elbow joint 30. The upper arm B 28 and upper arm A 29 form the upper arm assembly 27, which telescopes and pivots about the base joint assembly 16.

Figure 3D:
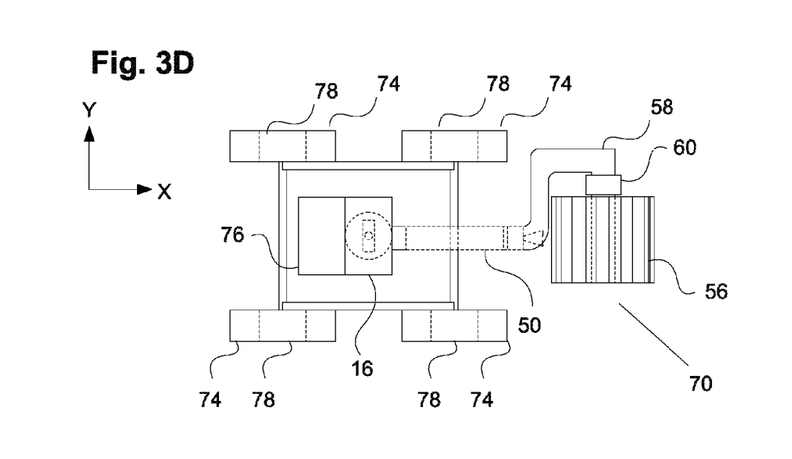
FIGS. 3D, 3E, and 3F are plan, side, and front view depictions, respectively, of an embodiment of vehicle snow and ice removal apparatus having a traversal mechanism.
Figure 3E:
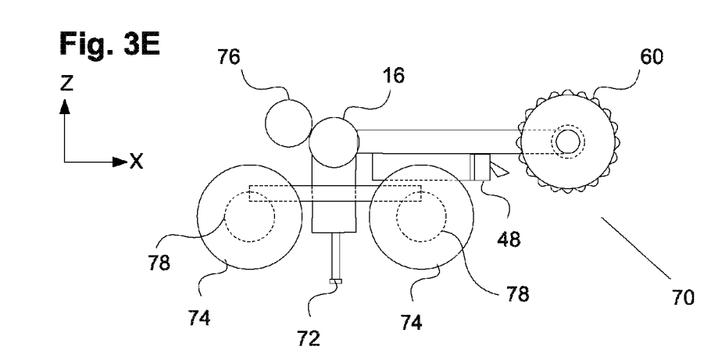
Figure 3F:
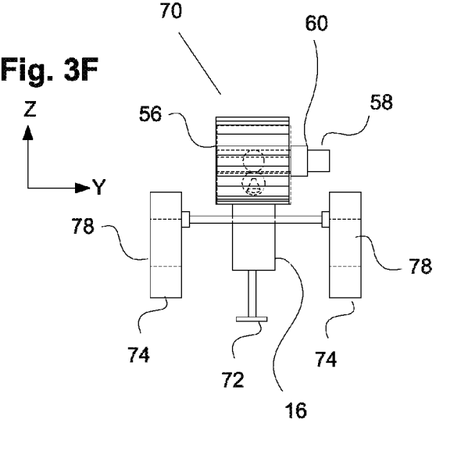

FIGS. 3D, 3E, and 3F are plan, side, and front view depictions, respectively, of a vehicle snow removal apparatus 1 having a traversal mechanism 70 equipped with a track lock 72 and wheels 74 that telescopes and pivots to secure the traversal mechanism 70 to the surface of a vehicle, and which guides all or part of the vehicle snow removal apparatus 1, for example the section containing the wrist joint assembly 44 to the brush 56, to traverse autonomously along the seam of a vehicle (such as along the edge of a car door where it meets other panels) such that the vehicle snow removal apparatus 1 follows the seams and deposits pre-treatment chemicals, or de-icing chemicals on the seam so that it is possible to open the door (trunk or hood) despite the car being covered in a sheet of ice.

Moreover, the vehicle snow removal apparatus 1 can use the aforementioned VCM and the seams of the car as a navigation aide that dictates which portions of the vehicle will be treated on a priority basis (e.g., seams treated prior to the primary panel surfaces, such as the hood or door panels), returning to its base, for example on the crosstrack 20, once the work is completed or as stored energy aboard the device is close to being depleted.

The traversal mechanism links to the crosstrack 20 when not in use and can traverse the vehicle's surface autonomously or with support of a winch 76 tethered to the traversal mechanism 70. The traversal mechanism 70 is controlled by the control module 6, steers by pivoting using the power of the track lock 72, which itself is substantially similar to the base joint assembly 16, and drives itself with at least one electric motor, for example an in-wheel motor 78 in each wheel.

Figure 4A:
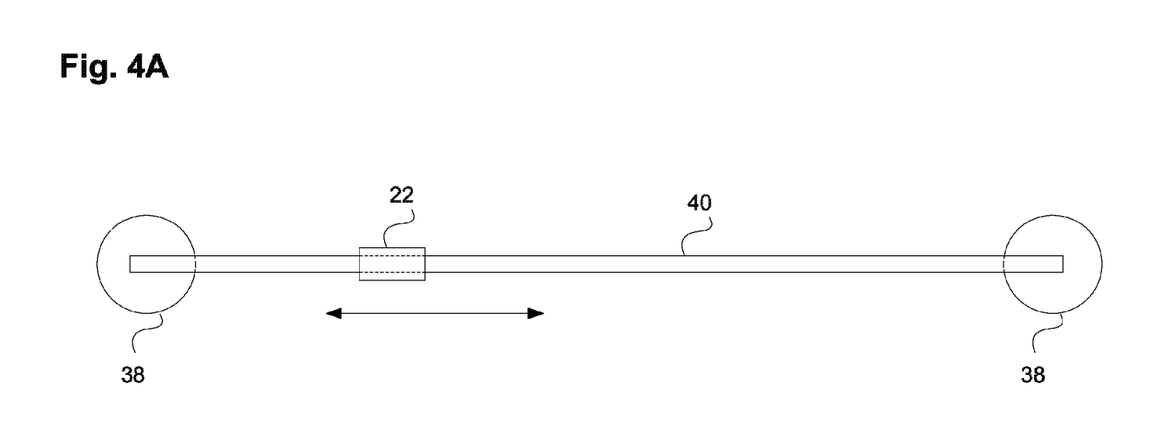
FIGS. 4A, 4B, and 4C are plan, side, and front views, respectively, of an embodiment of a track mount assembly.
Figure 4B:
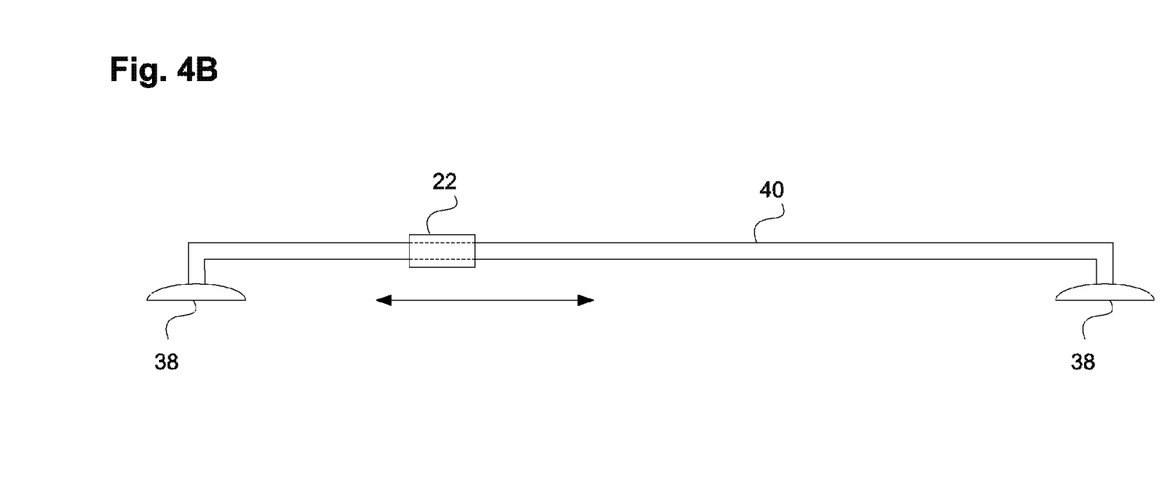
Figure 4C:
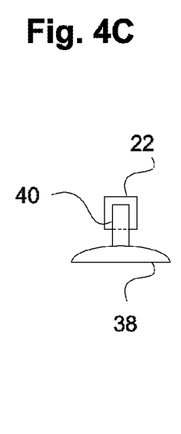

FIGS. 4A, 4B, and 4C are plan, side, and front views, respectively, of an embodiment of a track mount 40 having a mounting 38 at each end, the track mount 40 also having a linear motor 22 which is a prismatic joint that moves along the length of the track mount 40.

Figure 5A:
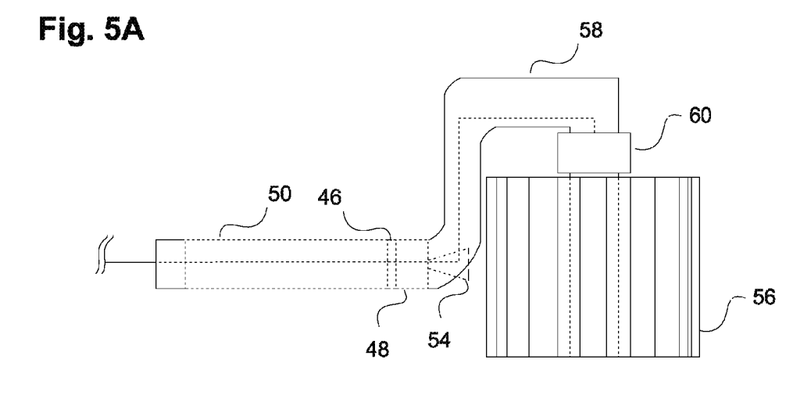
FIGS. 5A, 5B, and 5C are plan, side, and front views, respectively, of an embodiment of a brush mount assembly.
Figure 5B:
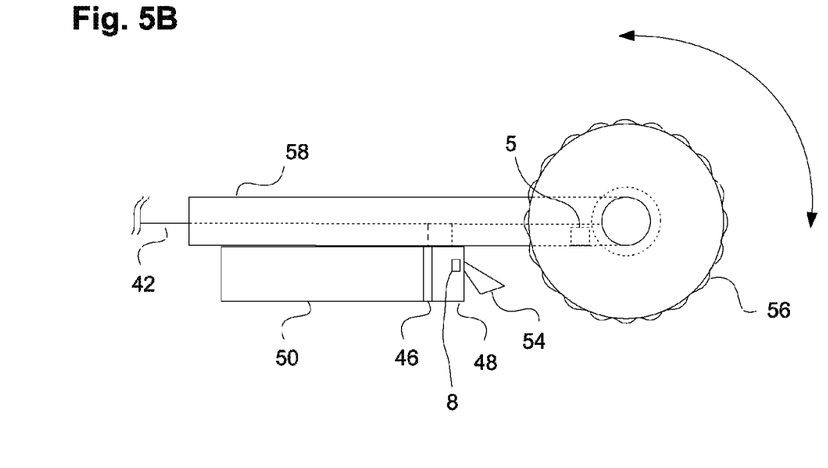
Figure 5C:
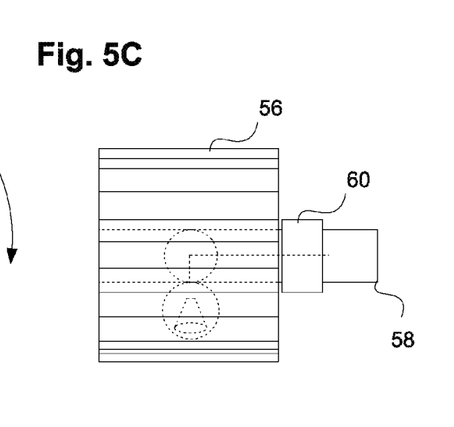

FIGS. 5A, 5B, and 5C are plan, side, and front views, respectively, of an embodiment of a brush mount 58 connected to a reservoir 50, a heating element 46, a flow meter 8, a pump 48, a spray nozzle 54, a contact sensor 5, a brush motor 60, and a brush 56, with a portion of a wiring harness 42 inside the brush mount 58 and terminating at the brush motor 60. The heating element 46 maintains temperature of the fluid in the reservoir 50 as it is pumped out by the pump 48 to the spray nozzle 54. The flow meter 8 measures fluid flow through the pump 48. The brush motor 60 controls the direction and rotational speed of the brush 56. Power for the heating element 46, the pump 48 and the brush motor 60 is supplied by the battery 2, and a wiring harness 42 connecting the battery 2 and the brush mount 58. The control module 6 controls the operation of the heating element 46, the pump 48, and the brush motor 60.

At a point when the deicing fluid in the first reservoir 50 is depleted, if there is a second reservoir 50 with deicing fluid located on one of the reservoir mounts 24 (FIG. 5) then the control module 6 rotates the brush mount 58 to an empty reservoir mount 24, removes the first depleted reservoir 50, into the empty reservoir mount 24 and then repositions the brush mount 58 to remove the second reservoir 50 containing deicing fluid. The brush mount 58 then snaps the second reservoir 50 into place and begins to monitor the temperature of the deicing fluid inside the second reservoir 50, heating it as necessary with the heating element 46, to a temperature sufficiently high to aid in melting accumulated snow or ice.

The brush 56 is substantially circular in its side profile. The surface of the brush 56 is shaped in a way to remove snow and ice as it rotates and slides over a vehicle 98 surface. It is connected to the brush motor 60 which rotates in either direction and at a speed that is in response to commands of the control module 6. The contact sensor 5 provides data to the control module 6 that contact has been made with a vehicle 98 surface or an unexpected object.

Figure 6A:
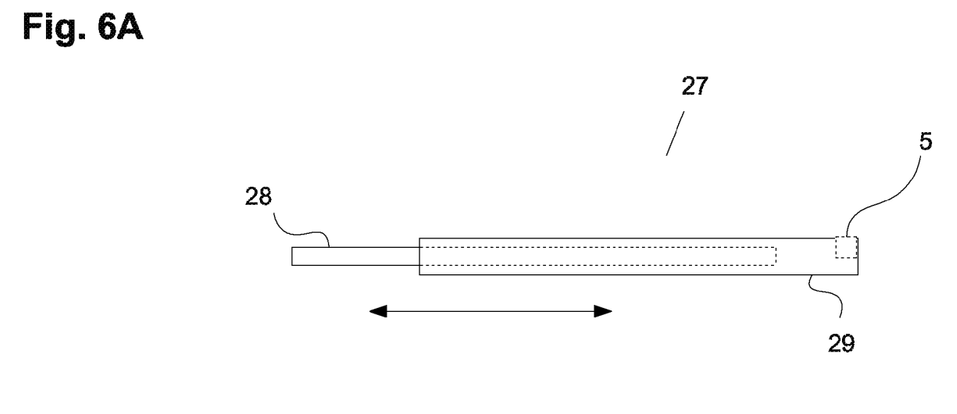
FIGS. 6A and 6B are side views of an upper arm assembly, retracted and extended, respectively.
Figure 6B:
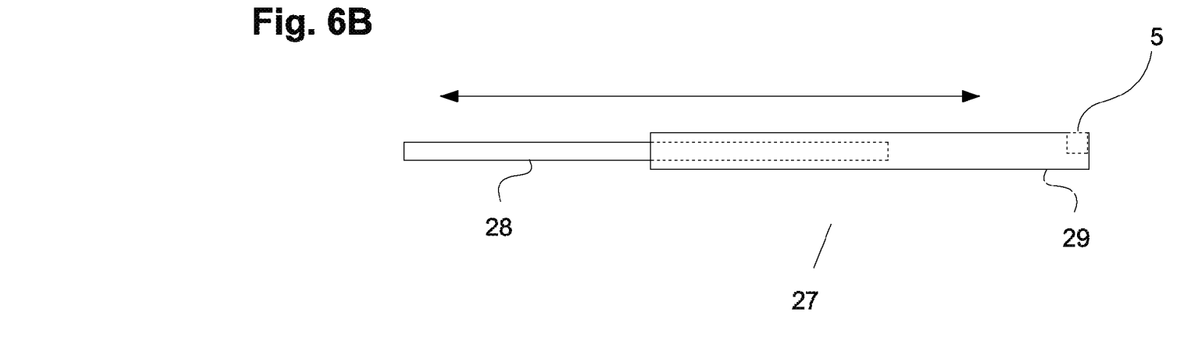

FIGS. 6A and 6B are side views of an embodiment of an upper arm assembly 27 having an upper arm A 29, an upper arm B 28, and at least one contact sensor 5. The upper arm B 28 is of a smaller cross section than the upper arm A 29 it is connected to. The upper arm B 28 and the upper arm A 29 form a prismatic joint with one degree of freedom where the upper arm B 28 telescopes from within the upper arm A 29 and extends outward along the length of the upper arm A 29, where they share a common longitudinal axis.

In this embodiment the upper arm A 29 and the upper arm B 28 form a linear motor, with one component serving as the primary and the other as the secondary (akin to a stator and rotor in a rotating electric motor), powered by the battery 2 and controlled by the control module 6. The free end of the upper arm A 29 is connected to the elbow joint 30. The free end of the upper arm B 28 is connected to the base joint assembly 16.

The contact sensor 5 provides data to the control module 6 that contact has been made with a vehicle 98 surface or an unexpected object.

In an alternate embodiment the upper arm A 29 and the upper arm B 28 are formed of hydraulic pistons and extend and retract by use of hydraulic fluid or compressed air.

Figure 7A:
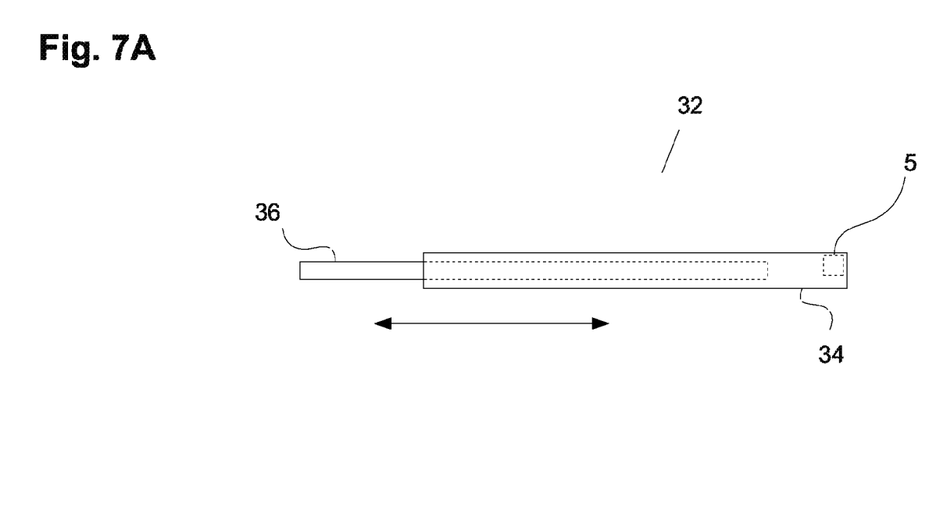
FIGS. 7A and 7B are side views of a forearm assembly, retracted and extended, respectively.
Figure 7B:
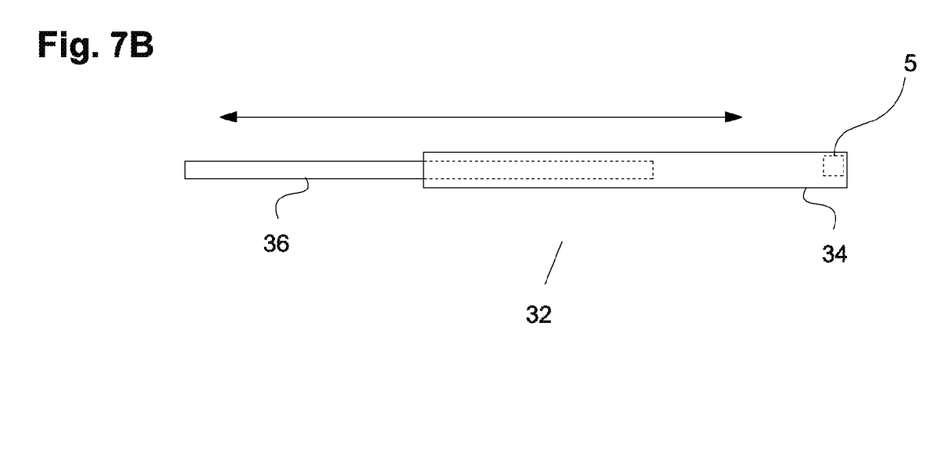

FIGS. 7A and 7B are views of an embodiment of a forearm assembly 32 having a forearm B 36, a forearm A 34, and at least one contact sensor 5. The forearm B 36 is of a smaller cross section than the forearm A 34 and is connected to the forearm A 34. The forearm A 34 and the forearm B 36 form a prismatic joint with one degree of freedom where the forearm B 36 telescopes from within the forearm A 34 and then extends outward along the length of the forearm A 34, where they share a common longitudinal axis.

In this embodiment the forearm B 36 and the forearm A 34 form a linear motor, with one component serving as the primary and the other as the secondary (akin to a stator and rotor in a rotating electric motor), powered by the battery 2 and controlled by the control module 6. The free end of the forearm A 34 is connected to the elbow joint 30. The free end of the forearm B 36 is connected to the wrist joint assembly 44.

The contact sensor 5 provides data to the control module 6 that contact has been made with a vehicle 98 surface or an unexpected object.

In an alternate embodiment the forearm B 36 and the forearm A 34 are formed of hydraulic pistons and extend and retract by use of hydraulic fluid or compressed air.

Figure 8A:
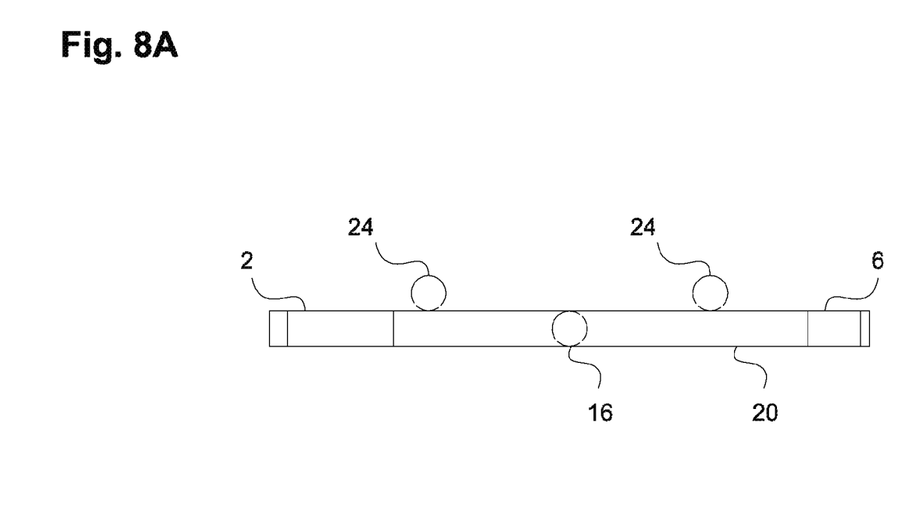
FIGS. 8A, 8B, and 8C are plan, front, and side views, respectively, of an embodiment of a crosstrack assembly.
Figure 8B:
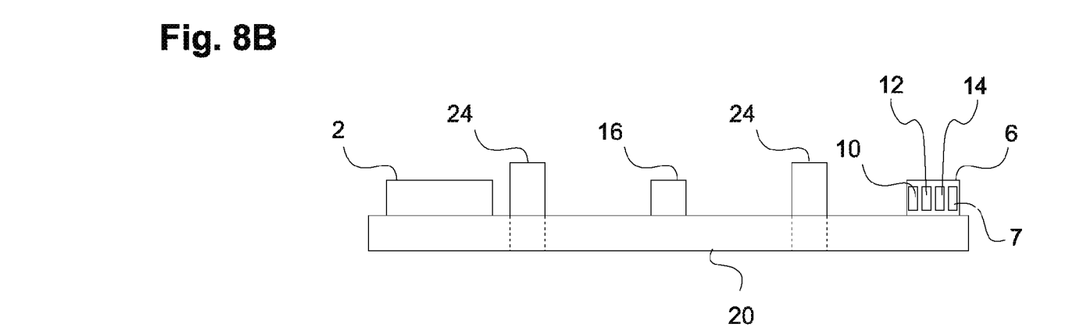
Figure 8C:
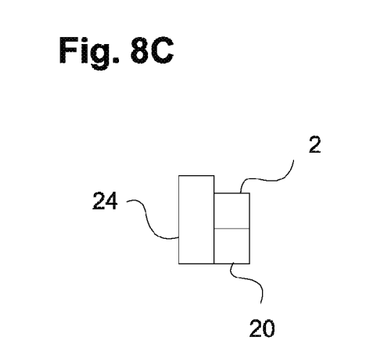

FIGS. 8A, 8B, and 8C are plan, front, and side views, respectively, of an embodiment of a crosstrack 20 connected to a base joint assembly 16, a control module 6 and a pair of reservoir mount 24.

The crosstrack 20 is connected at either end to a linear motor 22 (FIG. 3). The base joint assembly 16 is connected to the upper arm B 28 (FIG. 3).

The battery 2 provides power to the entire vehicle snow removal apparatus 1, the main power consuming components of which are the control module 6, the base joint assembly 16, the linear motor 22 and track mount 40, the upper arm B 28, the upper arm A 29, an elbow joint 30, a forearm assembly 32, a forearm A 34, a forearm B 36, the wrist joint assembly 44, the brush motor 60, and the flow meter 8.

The control module 6 includes a clock 10, the temperature sensor 12, and wireless circuitry 14, and controls the movement of the vehicle snow removal apparatus 1 and its operation, and its communication with any other device. The clock 10 is a clock used to time and schedule operations of the vehicle snow removal apparatus 1. The temperature sensor 12 is used to gather data about ambient conditions and deicing fluid conditions. The wireless circuitry 14 is circuitry to send and receive data, for example through smart phones and other wireless devices.

Each reservoir mount 24 holds a spare reservoir 50 which can be exchanged as needed by the vehicle snow removal apparatus 1 for the reservoir 50 mounted on the wrist joint assembly 44.

In an alternate embodiment the battery 2 is charged by an external power source, for example a home charging system that plugs into a wall outlet, or a mobile or stationary electric vehicle charging station.

In an alternate embodiment the battery 2 is charged by the vehicle 98 battery or electrical system as needed. If the vehicle 98 battery charge falls below a predetermined threshold the control module 6 can automatically start the vehicle 98 or prompt the user to do so to maintain a steady power supply to complete the operation. The control module 6 may also account for the vehicle 98 fuel level as well, to ensure sufficient running time and driving range once the vehicle 98 is ready to drive.

Figure 9A:
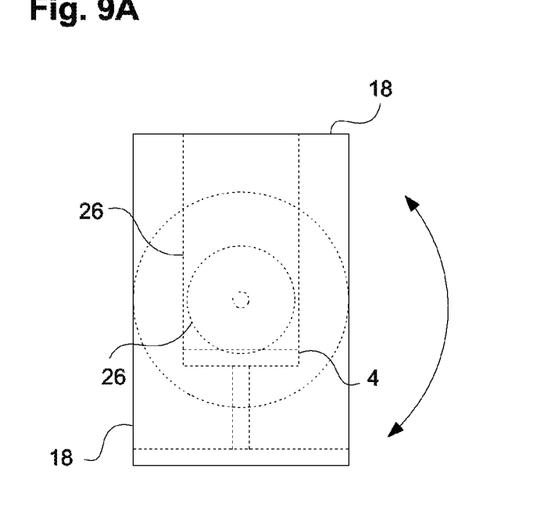
FIGS. 9A, 9B, and 9C are plan, side, and front views, respectively, of an embodiment of a paired revolute joint assembly.
Figure 9B:
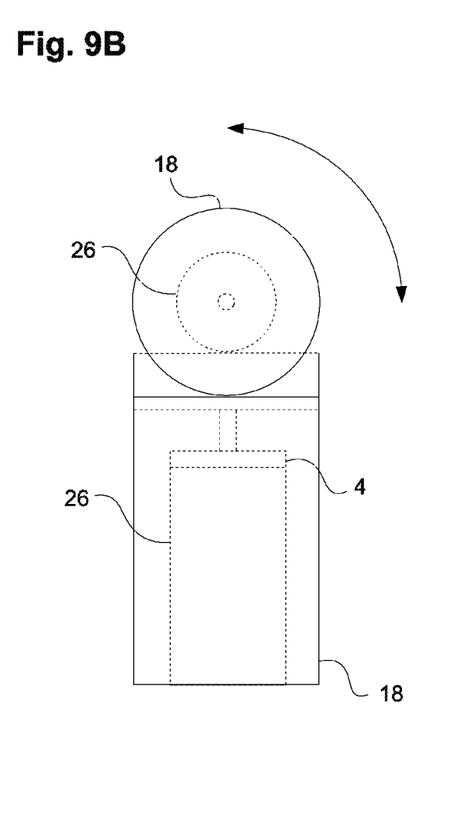
Figure 9C:
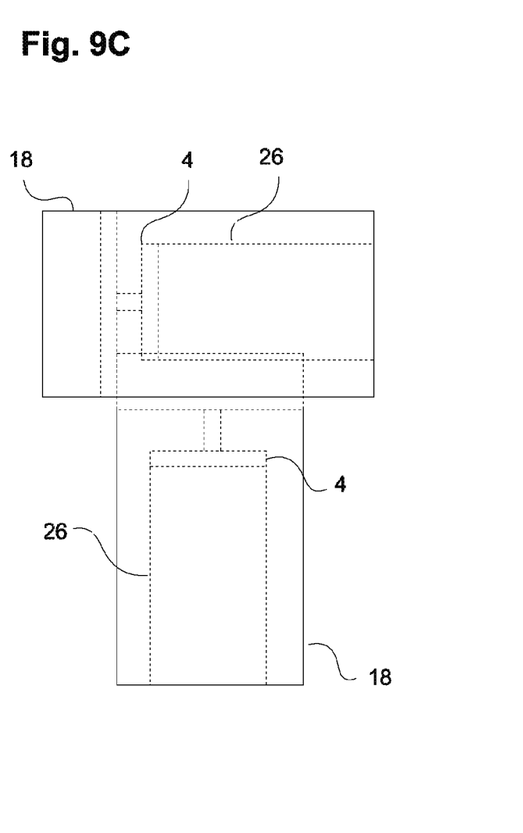

FIGS. 9A, 9B, and 9C are plan, side, and front views, respectively, of an embodiment of paired revolute joints 18, allowing rotational movement about two orthogonal axes, each revolute joint 18 having a stepper motor 26 and a torque sensor 4, the revolute joint 18 connected to another revolute joint 18 having a stepper motor 26 and a torque sensor 4. The first revolute joint 18 is orthogonal to the second revolute joint 18, with each revolute joint 18 rotates about an axis perpendicular to the axis of the other revolute joint 18.

The power for each stepper motor 26 is provided by the battery 2, and each stepper motor 26 is controlled by the control module 6. The base joint assembly 16 and the wrist joint assembly 44 are of this type of design.

The base joint assembly 16 is connected to the crosstrack 20 at one of the revolute joints 18, and the other revolute joint 18 is connected to the upper arm B 28. The wrist joint assembly 44 is connected at one of its revolute joints 18 by the forearm B 36 and its other revolute joint 18 is connected to the brush mount 58.

The base joint assembly 16 and the wrist joint assembly 44 each rotate about two axes (FIGS. 3A, 3B, 3C).

Figure 10A:
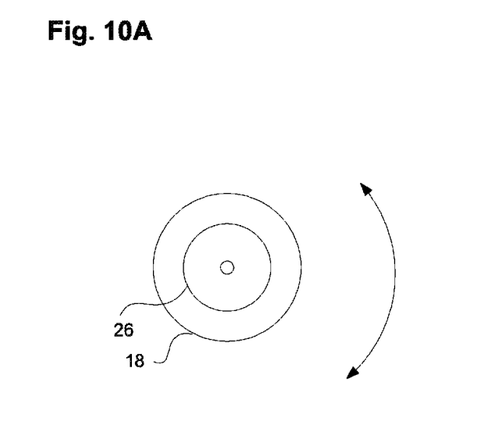
FIGS. 10A and 10B are plan and side views, respectively, of an embodiment of a single revolute joint assembly.
Figure 10B:
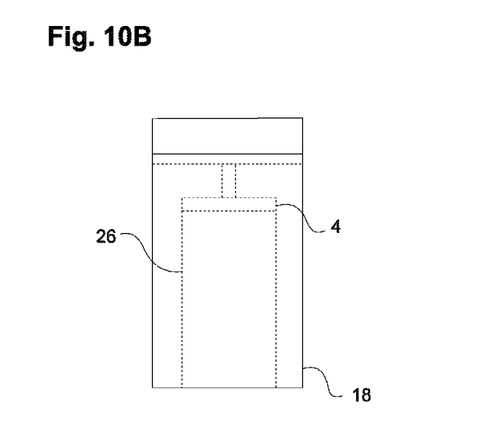

FIGS. 10A and 10B are plan and side views, respectively, of an embodiment of a single revolute joint 18. Power for the stepper motor 26 is provided by the battery 2, and the stepper motor 26 is controlled by the control module 6. This assembly is also used as an elbow joint 30. The elbow joint 30 is also connected to the upper arm A 29 and the forearm A 34, and rotates about one axis (FIG. 3A, 3B, 3C).

Figure 11A:
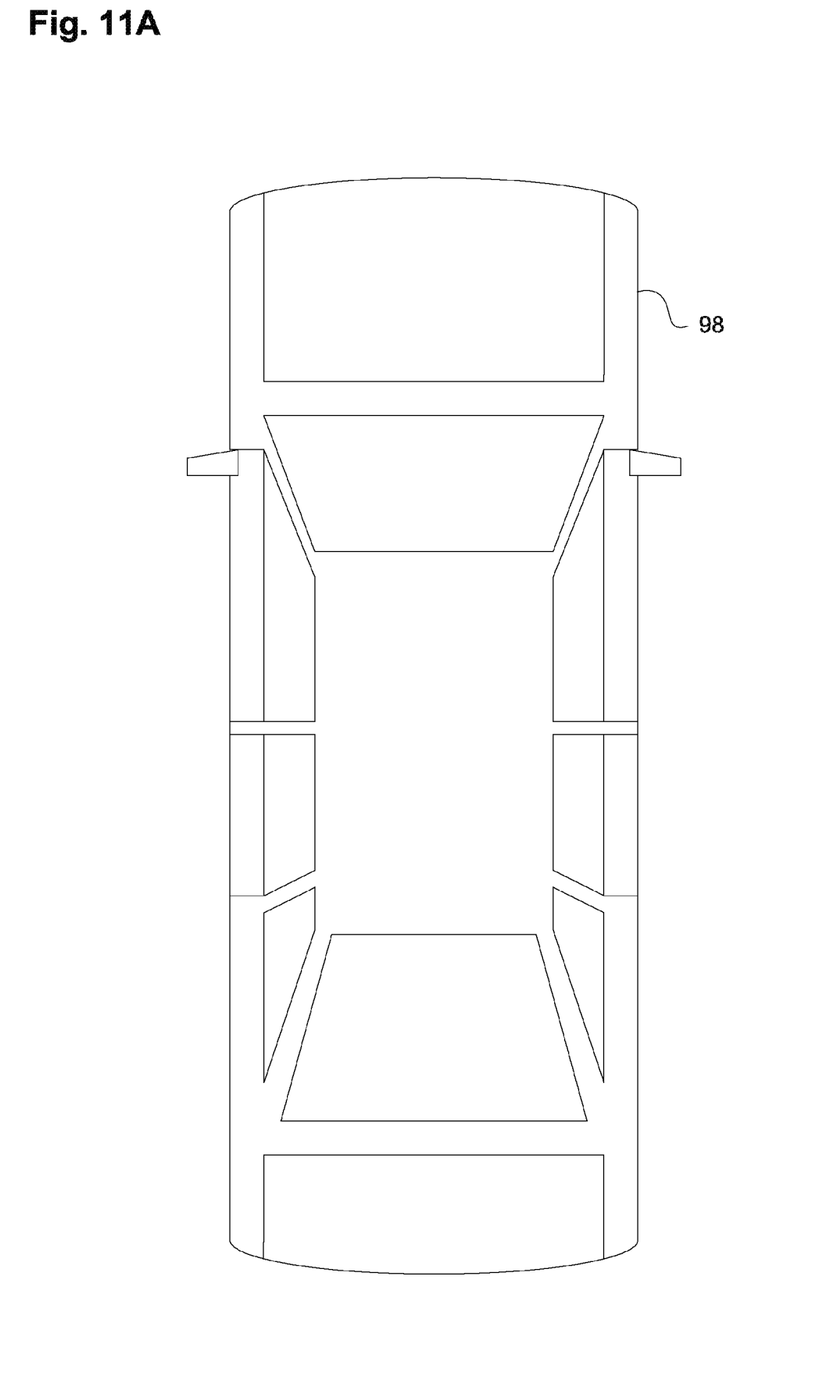
FIGS. 11A and 11B are plan views of a vehicle without and equipped with an embodiment of a snow and ice removal apparatus, respectively.
Figure 11B:
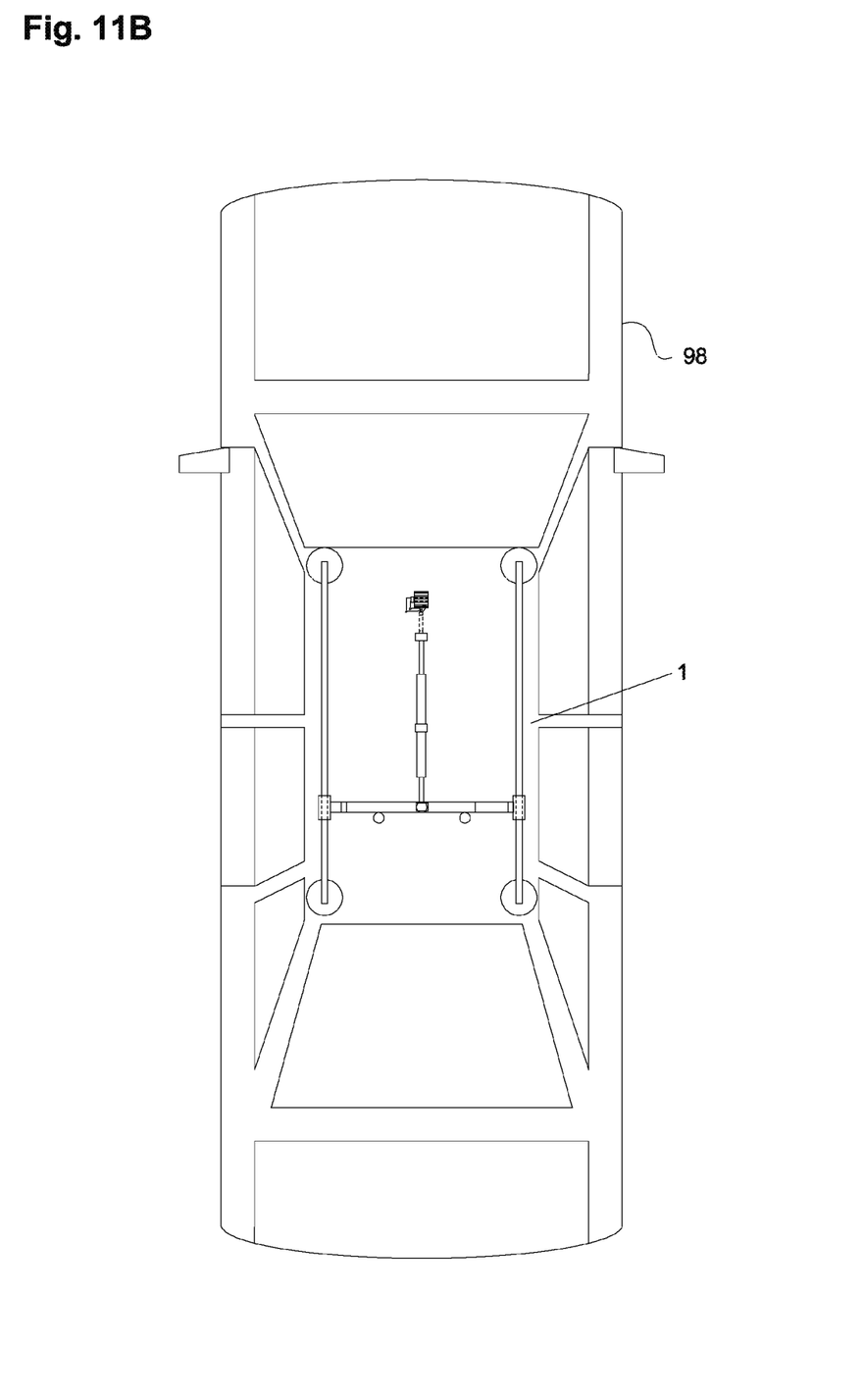

FIGS. 11A and 11B are plan views of a vehicle 98 without and equipped with an embodiment of a vehicle snow removal apparatus 1, respectively;

FIG. 12 is a detailed diagram of an embodiment of a process, shown at Step 113 (FIG. 1), performed by the control module 6, for removal of snow and ice from a vehicle 98 surface.

At Step 301 the control module 6 decides how the vehicle snow removal apparatus 1 operates by the fore/aft movement of the linear motors 22 along the track mounts 40, followed by the simultaneous adjustment of the lengths of the upper arm A 29 and the forearm assembly 32 with the rotation of the base joint assembly 16 about the Z and Y axes, the rotation of the elbow joint 30 about the Y-axis, and the rotation of the wrist joint assembly 44 about the Y and X axes to achieve the needed positioning for each step of each task.

As the movements of the vehicle snow removal apparatus 1 result in contact between the brush 56 and a part of the vehicle corresponding to a zone of the VCM, or unexpected contact between any part of the vehicle snow removal apparatus 1 and an obstacle, it is detected by the at least one torque sensor 4 or the at least one contact sensor 5.

In one embodiment the torque sensor 4 senses torque resisting movement about a joint in which the torque sensor 4 is positioned. This data is used by the control module 6 to determine contact or obstacles. The control module 6 then decides whether to tilt or rotate components of the vehicle snow removal apparatus 1 to accommodate continued activity or stops and prompts the user for input.

In another embodiment the vehicle snow removal apparatus 1 is equipped with video capability transmitted by the wireless circuitry 14 for the user to remotely view snow and ice accumulation on the vehicle, progress of operation of the vehicle snow removal apparatus 1, or to use for surveillance of the immediate area around the vehicle.

At Step 302 the control module 6 directs the brush 56 to begin rotation once in contact with a vehicle surface at a location corresponding to an area of the VCM that is represented by the current task in the planned order of operations.

At Step 303 the control module 6 directs the pump 48 to dispense deicing fluid as determined by the operations plan. During Step 113 (FIG. 1) the deicing fluid is continuously heated by the heating element 46 and pumped by the pump 48 from the reservoir 50 and through the spray nozzle 54 on to the vehicle surface at periodic intervals.

At Step 304 the control module 6 continuously monitors and records sensor data to memory 7, for example the energy level in the battery 2, the fluid temperature, the need to replace the reservoir 50 connected to the brush mount 58 due to depleted deicing fluid level, based on how much is dispensed through the pump 48 as measured by the flow meter 8, and the need to halt movement of any part of the vehicle snow removal apparatus 1 due to any unexpected contact of any components such as the brush mount 58.

Further the actual movement of the linear motors 22, the base joint assembly 16, the upper arm B 28, the elbow joint 30, the forearm assembly 32, and the wrist joint assembly 44 are recorded and compared to the scheduled tasks to track coverage of the VCM.

At Step 305 the decision is made whether or not to continue operation of the vehicle snow removal apparatus 1.

The decision depends on whether the scheduled tasks are completed, the needed resources are depleted, or the vehicle snow removal apparatus 1 detects a machine fault or unexpected contact, for example through the torque sensor 4.

If the control module 6 decides to proceed then it returns to Step 301 and continues. If the control module 6 decides to halt operations then it proceeds to Step 114 (FIG. 1).

In the drawings, like reference numerals designate identical or corresponding parts throughout the several views. Further, as used herein, the words "a", "an" and the like generally carry a meaning of "one or more", unless stated otherwise. The drawings are generally drawn to scale unless specified otherwise or illustrating schematic structures or flowcharts.

Referring now to the drawings, wherein like reference numerals designate identical or corresponding parts throughout the several views.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernable variants of the teachings herein, define, in part, the scope of the foregoing claim terminology such that no inventive subject matter is dedicated to the public.

What is claimed is:

1. A system for clearing snow and ice from a vehicle surface comprising:
    a mobile robotic arm;
    a brush mounted on the robotic arm;
    wireless communication circuitry;
    an electrical power source; and
    control circuitry that controls the robotic arm and the wireless communication circuitry;
    a vehicle contour map (VCM) that is preloaded in the control circuitry and/or created by the control system based on coordinate data obtained through a plurality of sensors, wherein
    the VCM includes coordinate data representative of the vehicle surface of said vehicle, and wherein
    said robotic arm is mounted on a vehicle and articulates about multiple axes and moves the brush over the vehicle surface so as to de-ice seams of the vehicle, and the communication circuitry is configured to receive weather alerts and in reply provide a signal to the control circuitry to control a movement of the robotic arm along the seams of the vehicle during a preventative chemical treatment of the seams and/or a de-icing of the seams.

2. The system according to claim 1 comprising:
    a motor; wherein
the motor spins the brush.

3. The system according to claim 1 comprising:
    a pump that pumps fluid through a line;
    a flow meter connected to the line;
    a spray nozzle connected to the line; and
    at least one fluid storage container that stores the fluid therein, wherein
the pump pumps fluid through the spray nozzle onto the vehicle surface and the flow meter measures the amount sprayed.

4. The system according to claim 3 comprising:
    a heating element, wherein
the heating element maintains a temperature range of the fluid inside the fluid storage container.

5. The system according to claim 3 further comprising:
    at least two fluid storage container mounts; and
    the at least one fluid storage container includes at least two fluid storage containers, wherein
the at least two fluid storage containers are exchangeable by the robotic arm.

6. The system according to claim 1 wherein:
    the control circuitry detects a low energy circumstance and automatically starts an engine of the vehicle to provide power for operating the robotic arm.

7. The system according to claim 1 wherein:
the VCM is preloaded in the control system.

8. The system according to claim 1 wherein:
    the plurality of sensors include a plurality of torque sensors, wherein
    the torque sensors are located in joints of the robotic arm and detect resistance to motion.

9. The system according to claim 8 wherein:
    the control system creates the vehicle contour map (VCM) that includes coordinate data representative of the vehicle surface based on torque sensor data obtained during an initiation process.

10. The system according to claim 1 wherein:
    the plurality of sensors include a plurality of contact sensors, wherein
    the contact sensors are located on the robotic arm and detect contact between the arm and external objects.

11. The system according to claim 10 wherein:
    the control system creates the vehicle contour map (VCM) that includes coordinate data representative of the vehicle surface based on contact sensor data obtained during an initiation process.

12. The system according to claim 1 wherein:
the control system downloads the VCM from an external source.

13. The system according to claim 1 wherein:
    an estimated time to clear snow and ice from the vehicle is calculated from data recorded from past operation of the control circuitry.

14. The system according to claim 1 wherein:
    an estimated time to clear snow and ice from the vehicle is calculated from data received from other similar apparatus within a given distance of the control system.

15. The system according to claim 1 wherein:
the control circuitry predicts a need to pretreat the vehicle surface with fluid based on weather forecast and temperature data received about the vehicle's location.

16. The system according to claim 1 wherein:
the control circuitry divides the VCM into representative sections of the vehicle surface area.

17. The system according to claim 16 wherein:
    the control circuitry prioritizes treatment of each VCM section by calculating the section's importance and the available resources needed for treatment of each section.

* * * * *